(12) United States Patent
Matsui

(10) Patent No.: US 6,477,556 B1
(45) Date of Patent: Nov. 5, 2002

(54) METHOD AND APPARATUS FOR ARITHMETIC OPERATION AND RECORDING MEDIUM OF METHOD OF OPERATION

(75) Inventor: Mitsuru Matsui, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/381,869

(22) PCT Filed: Jan. 21, 1999

(86) PCT No.: PCT/JP99/00206
§ 371 (c)(1),
(2), (4) Date: Sep. 27, 1999

(87) PCT Pub. No.: WO99/38142
PCT Pub. Date: Jul. 29, 1999

(30) Foreign Application Priority Data

Jan. 27, 1998 (JP) ............................................. 10-013924

(51) Int. Cl.$^7$ ................................................. G06F 7/52
(52) U.S. Cl. ........................................ 708/650; 708/655
(58) Field of Search ................................ 708/491, 492, 708/650, 653, 655, 656

(56) References Cited

U.S. PATENT DOCUMENTS

| 5,379,243 | A | * | 1/1995 | Greenerger et al. | ......... 708/650 |
| 5,463,690 | A |   | 10/1995 | Crandall | |
| 5,644,639 | A | * | 7/1997 | Naciri et al. | ................. 708/491 |
| 6,175,850 | B1 | * | 1/2001 | Ishii et al. | .................... 708/491 |

FOREIGN PATENT DOCUMENTS

| EP | 717350 A2 | 12/1995 |
| JP | 06075525 A | 3/1994 |
| JP | A8-115205 | 5/1996 |
| JP | 08179690 A | 7/1996 |
| JP | A9- 91270 | 4/1997 |
| JP | 09090870 A | 4/1997 |
| JP | A9-198232 | 7/1997 |

* cited by examiner

Primary Examiner—Chuong Dinh Ngo

(57) ABSTRACT

An integer Z101 is divided by an integer I102 to obtain a remainder R109. The integer I102 includes a polynomial of power of a basic operational unit of a computer. In this way, the integer I for divisor is limited based on the basic operational unit of the computer, thus a shift operation, which is required for a conventional operation method, can be eliminated. The remainder can be calculated by only addition and subtraction. Accordingly, a code size becomes compact and the remainder of the integer can be calculated at a high speed.

9 Claims, 16 Drawing Sheets

eeee dddd cccc bbbb aaaa | 9999 8888 7777 6666 5555 4444 3333 2222 1111 0000

+) eeee dddd cccc bbbb aaaa

−) eeee dddd cccc bbbb aaaa

−) eeee dddd cccc bbbb aaaa

+) eeee dddd cccc bbbb aaaa

R = 999a 7776 6666 5554 5556 4443 999a 3333 2222 aaaa

Fig.4

ADD Zh(1)~Zh(5) TO W(1)~W(5)                                 ~401
9999  8888  7777  6666  5556  3333  1110  eeee  cccc  aaaa SUBTRACT Zh(1)~Zh(5) FROM W(2)~W(6)                          ~402
9999  8888  7777  6665  6667  5555  4444  3333  2222  aaaa SUBTRACT Zh(1)~Zh(5) FROM W(4)~W(8)                          ~403
9999  8887  8888  8887  999a  9999  999a  3333  2222  aaaa ADD Zh(1)~Zh(5) TO W(5)~W(9)                                 ~404
999a  7776  6666  5554  5556  4443  999a  3333  2222  aaaa

Fig.6

$W(1) = W(1) + Zh(1)$  = aaaa  — 601

$W(2) = W(2) + Zh(2) - Zh(1)$  = 2222  — 602

$W(3) = W(3) + Zh(3) - Zh(2)$  = 3333  — 603

$W(4) = W(4) + Zh(4) - Zh(3) - Zh(1)$  = 999a (BORROW OCCURS) — 604

$W(5) = W(5) + Zh(5) - Zh(4) - Zh(2) + Zh(1) - 1$  = 4443 — 605

$W(6) = W(6) - Zh(5) - Zh(3) + Zh(2)$  = 5556 (BORROW OCCURS) — 606

$W(7) = W(7) - Zh(4) + Zh(3) - 1$  = 5554 — 607

$W(8) = W(8) - Zh(5) + Zh(4)$  = 6666 — 608

$W(9) = W(9) + Zh(5)$  = 7776 (CARRY OCCURS) — 609

```
        Zh(6) Zh(5) Zh(4) Zh(3) Zh(2) Zh(1) | Zl(10) Zl(9) Zl(8) Zl(7) Zl(6) Zl(5) Zl(4) Zl(3) Zl(2) Zl(1)
Z=      ffff  eeee  dddd  cccc  bbbb  aaaa  | 9999   8888  7777  6666  5555  4444  3333  2222  1111  0000
         703                                                          704
                                         +)                                ffff  eeee  dddd  cccc  bbbb  aaaa  — 705
                                         −)                                ffff  eeee  dddd  cccc  bbbb  aaaa  — 706
                                                                                                        707
                                         −)      ffff  eeee  dddd  cccc  bbbb  aaaa  — 708
                                        ─────────────────────────────────────────────────────────────────
                                         +)  1   9998  7777  6665  5555  4443  999a  3333  2222  aaaa
709                                      −)      ffff  ffff  ffff  ffff  ffff  ffff  0001  0000  0000  ffff
710                                     ─────────────────────────────────────────────────────────────────
711  R=                                      1   9998  7777  6665  5556  5555  4444  9999  3333  2221  aaab
```

Fig.8

ADD Zh(1)~Zh(6) TO W(1)~W(6)

9999 8888 7777 6667 5555 3333 1110 eeee cccc aaaa  
                     801

SUBTRACT Zh(1)~Zh(6) FROM W(2)~W(7)

9999 8888 7776 6667 6666 5555 4444 3333 2222 aaaa  
                     802

SUBTRACT Zh(1)~Zh(6) FROM W(4)~W(9)

9998 8887 8889 9999 9999 999a 3333 2222 aaaa  
                     803

ADD Zh(1)~Zh(6) TO W(5)~W(10)

1 9998 7777 6665 5556 5555 4443 999a 3333 2222 aaaa  
                     804

Fig.9

$W(1) = W(1) + Zh(1)$     $= aaaa$   901

$W(2) = W(2) + Zh(2) - Zh(1)$     $= 2222$   902

$W(3) = W(3) + Zh(3) - Zh(2)$     $= 3333$   903

$W(4) = W(4) + Zh(4) - Zh(3) - Zh(1)$     $= 999a$ (BORROW OCCURS)   904

$W(5) = W(5) + Zh(5) - Zh(4) - Zh(2) + Zh(1) - 1$     $= 4443$   905

$W(6) = W(6) + Zh(6) - Zh(5) - Zh(3) + Zh(2)$     $= 5555$   906

$W(7) = W(7) - Zh(6) + Zh(4) + ZH(3)$     $= 5556$ (BORROW OCCURS)   907

$W(8) = W(8) - Zh(5) + Zh(4) - 1$     $= 6665$   908

$W(9) = W(9) - Zh(6) + Zh(5)$     $= 7777$   909

$W(10) = W(10) + Zh(6)$     $= 9998$ (CARRY OCCURS)   910

Fig.10

$$I = \text{ff9c} \cdot 2^{144} + 1 \quad \text{—1002}$$

```
              Zh(5) Zh(4) Zh(3) Zh(2) Zh(1) | ZI(9) ZI(8) ZI(7) ZI(6) ZI(5) ZI(4) ZI(3) ZI(2) ZI(1)
       Z =    dddd cccc  bbbb aaaa  9999    | 8888 7777 6666 5555 4444 3333 2222 1111 0000
              ~~~~~1001                       ~~~~~~~~~~~~~~~~~1004
                                              8888 7777 6666 5555 4444 3333 2222 1111 0000
                                                                                  ~~~~1007
                                           -)                        de34 9958 a256 163f
                                           ─────────────────────────────────────────────────
                                              8888 7777 6666 5555 4443 54fe 88c9 6eb5 e9c1
                                         4a35
                                  R =    4a35 ~~~~1008
                                         ~~~~1005
```

| OPERATION | QUOTIENT | REMAINDER |
|---|---|---|
| dddd cccc/ff9c | de34 | 991c |
| 991c bbbb/ff9c | 9958 | a21b |
| a21b aaaa/ff9c | a25b | 1636 |
| 1636 9999/ff9c | 163f | 4a35 | q = de34 9958 a25b 163f  ~~~~1006
r = 4a35

$I = 2^{160} + \text{ff9d}$

Z = dddd cccc bbbb aaaa | 9999 8888 7777 6666 5555 4444 3333 2222 1111 0000

- aaaa × ff9d = aa68 0042
- dddd × ff9d = bb72 66af
- cccc × ff9d = cc7c cd1c
- dddd × ff9d = dd87 3389 aa68 0042  
bb72 66af  
cc72 cd1c  
dd87 3389  
−)

R = 9999 8888 7777 6666 5554 332c 9992 fff9 ffbe

METHOD AND APPARATUS FOR ARITHMETIC OPERATION AND RECORDING MEDIUM OF METHOD OF OPERATION

TECHNICAL FIELD

This invention relates to an operation apparatus, an operation method for calculating a remainder, and a recording medium thereof. In particular, the invention relates to an operation apparatus, an operation method for calculating a remainder using a computer, and a recording medium thereof.

BACKGROUND ART

Related Art 1.

In the following, as the first conventional related art, an example of the conventional technique, where a remainder operating method disclosed in U.S. Pat. No. 5,463,690 is applied, will be explained referring to FIG. 15. This relates to an operation method for calculating a remainder of an integer Z divided by a prime number P. Here, it is assumed that the prime number P is limited to be a number which can be represented by $2^q - C$ (q: a natural number; C: a relatively small odd number). By limiting the prime number as the above, the remainder can be calculated using only shift operation, addition and subtraction. Here, the calculation of remainder is performed by a computer having $2^M$ as a basic operational unit.

For example, as shown in FIG. 15, the remainder of the integer 685 divided by the prime number 13 (q=4, C=3) can be calculated using the computer having $2^3$ (3 bits) as the basic operational unit, and the operation will be described in the following: When represented by binary number, 685 becomes (1010101101).

First, the lowest bits q=4 bits 1401 (1101) of the integer Z=685 are latched. Next, data 1403 (1111110), which is the remaining bits 1402 (101010) multiplied by C=3, is calculated by shift operation and addition. Then, the obtained data 1403 is added to the data 1401 (1101) to obtain data 1404 (10001011).

Then, the lowest bits q=4 bits 1405 (1011) of the data 1404 are latched. Subsequently, data 1407 (11000), which is the remaining bits 1406 (1000) multiplied by C=3, is calculated by shift operation and addition. Further, the data 1407 is added to the data 1405 to produce data 1408 (100011).

Then, the lowest bits q=4 bits 1409 (0011) of the obtained data 1408 are latched. Subsequently, data 1411 (110), which is the remaining bits 1410 (10) multiplied by C=3, is calculated by shift operation and addition. Further, the data 1411 is added to the data 1409 to produce data 1412 (10001).

The data 1412 includes q bits where q is q=4 or q=less than 4, and is a remainder of the integer Z divided by the prime number P. Namely, (1001)=9, and the remainder 9 of 685 divided by 13 is obtained.

Related Art 2.

In the following, as the second conventional related art, an operating method for calculating a remainder R of a division of an integer Z by an integer I will be explained referring to FIG. 16. The operating method is considered basically in the same way as the first related art, however, the concrete number used therein is different from the first related art. The operating method implemented by the 16-bit computer will be explained, and the operation is performed with 16 bits as a processing unit. In FIG. 16, a reference numeral 1501 shows an integer Z, 1502 shows an integer I(I=$2^{160}$ +ff9d), 1503 shows higher 64 bit data Zh of the integer Z, 1504 shows lower 160 bit data Zl of the integer Z, and 1509 shows a remainder R. In FIG. 16, the integer Z and the remainder R are represented by hexadecimal numbers, and in the integer I, $2^{160}$ is represented by decimal number, ff9d by hexadecimal number.

The highest 16 bits of I are 1, and the remainder can be calculated by subtracting Zh 1503 multiplied by ff9d from Zl 1504. Concretely, the following process is used for calculating the remainder.

First, the lowest 16 bit data aaaa of Zh 1503 is multiplied by ff9d to obtain 32 bit data aa680042 (1505) (multiplication 1). Next, bbbb is multiplied by ff9d to obtain 32 bit data bb7266af (1506) (multiplication 2). Subsequently, cccc is multiplied by ff9d to obtain 32 bit data cc7ccd1c (1507) (multiplication 3).

Then, dddd is multiplied by ff9d to obtain 32 bit data dd873389 (1508) (multiplication 4). Through the above 4 multiplications, a product of multiplication of Zh and ff9d is obtained.

Subsequently, this product is subtracted from Zl (1504). In the following, addition and subtraction include carry and borrow.

First, 0042 is subtracted from the lowest 16 bit data 0000 of Zl (1504) (addition/subtraction 1). Next, aa68 is subtracted from 1111 (addition/subtraction 2), and further 66af is subtracted (addition/subtraction 3). Subsequently, bb72 is subtracted from 2222 (addition/subtraction 4), and further cd1c is subtracted (addition/subtraction 5). Then, cc7s is subtracted from 3333 (addition/subtraction 6), and further 3389 is subtracted (addition/subtraction 7). Finally, dd87 is subtracted from 4444 (addition/subtraction 8).

As has been described, the remainder R 1509 of the integer Z divided by the integer I is calculated through 4 multiplications and 8 additions/subtractions.

In the above related arts, when the prime number P is $2^q - C$ (C is a relatively small odd number), the remainder can be calculated without division, which allows the operation proceed quickly. However, even if the calculation excludes the division, the calculation includes the shift operation, which limits the operating speed of the calculation.

Further, as clearly described in the second related art, when the integer I is $2^q - f$ (q=4, f=3 in the first related art, q=160, f=ff9d in the second related art), f (3 or ff9d) multiplication steps are required. And the multiplication result exceeds 16 bits of the basic operation unit, so that the number of accompanied additions or subtractions becomes large. Consequently, the code size becomes large, and when the number of processing steps is large, the operation may delay.

The present invention is provided to solve the above-mentioned problems, and aims to obtain an operation apparatus, operation method for calculating the remainder of the integer at a high speed using a computer and recording medium thereof.

DISCLOSURE OF THE INVENTION

An operation apparatus in relation to the present invention for calculating a remainder R of data Z having Bz bits divided by data I represented by a following equation:

$$I = \sum_{N=0}^{N=N_{\max}} A_N Q^{MN}$$

(M is a number of bits of a basic operational unit; N is a natural number being one of 0 through Nmax, $A_0$ is a value whose absolute value is smaller than a value represented by the basic operational unit of M bits; each of $A_1$ through $A_{Nmax-1}$ is +1, 0, or −1; $A_{Nmax}$ is +1, or −1; and Q is a natural number equal to or more than 2) the operation apparatus includes:

(1) a data Zl storing region for storing data Zl of lower M×Nmax bits of the data Z;

(2) a data Zh storing region for storing data Zh of higher (Bz−M×Nmax) bits of the data Z;

(3) a data $A_N$ storing region for storing the data $A_N$; and (4) an addition/subtraction unit for calculating the remainder R by determining an operation between addition and subtraction based on positive/negative of the data $A_N$, and operating addition/subtraction of data stored in at least a part of the data Zl storing region and data stored in at least a part of the data Zh storing region.

Further, in the operation apparatus, the data Zl storing region stores the data Zl as data Zl(i) divided by the basic operational unit of M bits sequentially from a lowest side within a range of a natural number i (1>i>Nmax) in a data Zl(i) region;

A the data Zh storing region stores the data Zh as data Zh(j) divided by the basic operational unit of M bits sequentially from a lowest side within a range of a natural number j (a natural number of 1>j>(Bz/M)−Nmax with raising its decimals) in a data Zh(j) region; and the addition/subtraction unit determines the operation between addition and subtraction using N having a predetermined relationship with i and j, and operates addition/subtraction of the data Zl(i) and the data Zh(j).

Further, in the operation apparatus, the addition/subtraction unit determines the operation using N having a relationship of N=i−j that the operation is subtraction when the data $A_N$ is positive, and that the operation is addition when the data $A_N$ is negative.

Further, in the operation apparatus, the addition/subtraction unit continuously operates addition/subtraction for pairs of i and j having a relationship of N=i−j against a certain N.

Further, in the operation apparatus, the addition/subtraction unit continuously operates addition/subtraction for pairs of N and j having a relationship of N=i−j against a certain i.

An operation method in relation to the present invention, using an operation apparatus, for calculating a remainder R of data Z having Bz bits divided by data I represented by a following equation:

$$I = \sum_{N=0}^{N=N_{\max}} A_N Q^{MN}$$

(M is a number of bits of a basic operational unit; N is a natural number being one of 0 through Nmax, $A_0$ is a value whose absolute value is smaller than a value represented by the basic operational unit of M bits; each of $A_1$ through $A_{Nmax-1}$ is +1, 0, or −1; $A_{Nmax}$ is +1, or −1; and Q is a natural number equal to or more than 2) the operation method includes:

(1) a data Zl storing step of storing data Zl of lower M×Nmax bits of the data Z;

(2) a data Zh storing step of storing data Zh of higher (Bz−M×Nmax) bits of the data Z;

(3) a data $A_N$ storing step of storing the data $A_N$; and (4) an adding/subtracting step of calculating the remainder R by determining an operation between addition and subtraction based on positive/negative of the data $A_N$, and operating addition/subtraction of data stored in at least a part of the data Zl storing region and data stored in at least a part of the data Zh storing region.

Further, in the operation method, the data Zl storing step stores the data Zl as data Zl(i) divided by the basic operational unit of M bits sequentially from a lowest side within a range of a natural number i (1≦i≦Nmax);

the data Zh storing step stores the data Zh as data Zh(j) divided by the basic operational unit of M bits sequentially from a lowest side within a range of a natural number j (a natural number of 1>j>(Bz/M)−Nmax with raising its decimals); and the adding/subtracting step determines the operation between addition and subtraction using N having a predetermined relationship with i and j, and operates addition/subtraction of the data Zl(i) and the data Zh(j).

In a computer readable recording medium in relation to the present invention having a computer readable program stored therein for causing a computer to perform an operation process using an operation apparatus for calculating a remainder R of data Z having Bz bits divided by data I represented by a following equation:

$$I = \sum_{N=0}^{N=N_{\max}} A_N Q^{MN}$$

(M is a number of bits of a basic operational unit; N is a natural number being one of 0 through Nmax, $A_0$ is a value whose absolute value is smaller than a value represented by the basic operational unit of M bits; each of $A_1$ through $A_{Nmax-1}$ is +1, 0, or −1; $A_{Nmax}$ is +1, or −1; and Q is a natural number equal to or more than 2) the operation process includes:

(1) a data Zl storing process for storing data Zl of lower M×Nmax bits of the data Z;

(2) a data Zh storing process for storing data Zh of higher (Bz−M×Nmax) bits of the data Z;

(3) a data $A_N$ storing process for storing the data $A_N$; and (4) an adding/subtracting process for calculating the remainder R by determining an operation between addition and subtraction based on positive/negative of the data $A_N$, and operating addition/subtraction of data stored in at least a part of the data Zl storing region and data stored in at least a part of the data Zh storing region.

Further, in the computer readable recording medium, the data Zl storing process stores the data Zl as data Zl(i) divided by the basic operational unit of M bits sequentially from a lowest side within a range of a natural number i (1>i>Nmax);

the data Zh storing process stores the data Zh as data Zh(j) divided by the basic operational unit of M bits sequentially from a lowest side within a range of a natural number j (a natural number of 1≦j≦(Bz/M)−Nmax with raising its decimals); and the additing/subtracting process determines the operation between addition and subtraction using N having a predetermined relationship with i and j, and operates addition/subtraction of the data Zl(i) and the data Zh(j).

An operation apparatus in relation to the invention for calculating a remainder R of data Z having Bz bits divided by data I represented by a following equation:

$$I = CQ^n \pm 1$$

(M is a number of bits of a basic operational unit; Q is a natural number equal to or more than 2; n is n≧M; and C is $1<C<Q^M$) the operation apparatus includes:

(1) a data Zl storing region for storing data Zl of lower n bits of the data Z;

(2) a data Zh storing region for storing data Zh of higher Bz−n bits of the data Z;

(3) a quotient calculating unit for calculating a quotient q and a remainder r by dividing the data Zh with the data C; and (4) an addition/subtraction unit for calculating the remainder R by adding the remainder r as a basic operational unit higher than the data Zl to the data Zl, and adding/subtracting the quotient q to/from an added result.

An operation method in relation to the present invention, using an operation apparatus, for calculating a remainder R of data Z having Bz bits divided by data I represented by a following equation:

$$I = CQ^n \pm 1$$

(M is a number of bits of a basic operational unit; Q is a natural number equal to or more than 2; n is n≧M; and C is $1<C<Q^M$) the operation method includes:

(1) a data Zl storing step of storing data Zl of lower n bits of the data Z;

(2) a data Zh storing step of storing data Zh of higher Bz−n bits of the data Z;

(3) a quotient calculating step of calculating a quotient q and a remainder r by dividing the data Zh with the data C; and (4) an adding/subtracting step of calculating the remainder R by adding the remainder r as a basic operational unit higher than the data Zl to the data Zl, and adding/subtracting the quotient q to/from an added result.

In a computer readable recording medium in relation to the invention having a computer readable program stored therein for causing a computer to perform an operation process using an operation apparatus for calculating a remainder R of data Z having Bz bits divided by data I represented by a following equation:

$$I = CQ^n \pm 1$$

(M is a number of bits of a basic operational unit; Q is a natural number equal to or more than 2; n is n≧M; and C is $1<C<Q^M$) the operation process includes:

(1) a data Zl storing process for storing data Zl of lower n bits of the data Z;

(2) a data Zh storing process for storing data Zh of higher Bz−n bits of the data Z;

(3) a quotient calculating process for calculating a quotient q and a remainder r by dividing the data Zh with the data C; and (4) an adding/subtracting process for calculating the remainder R by adding the remainder r as a basic operational unit higher than the data Zl to the data Zl, and adding/subtracting the quotient q to/from an added result.

An operation apparatus in relation to the present invention for calculating a remainder R of data Z divided by data P includes a data I judging unit for judging if the data P equals a predetermined data I.

Further, in the operation apparatus, the predetermined data I of the data I judging unit is represented by a following equation:

$$I = \sum_{N=0}^{N=N_{\max}} A_N Q^{MN}$$

(M is a number of bits of a basic operational unit; N is a natural number being one of 0 through Nmax, $A_0$ is a value whose absolute value is smaller than a value represented by the basic operational unit of M bits; each of $A_1$ through $A_{Nmax-1}$ is +1, 0, or −1; $A_{Nmax}$ is +1, or −1; and Q is a natural number equal to or more than 2)

Further, in the operation apparatus, the predetermined data I of the data I judging unit is represented by a following equation:

$$I = CQ^n \pm 1$$

(M is a number of bits of a basic operational unit; Q is a natural number equal to or more than 2; n is n≦M and C is $1<C<Q^M$)

An operation method in relation to the present invention for calculating a remainder R of data Z divided by data P includes a data I judging step of judging if the data P equals a predetermined data I.

Further, in the operation method, the predetermined data I of the data I judging unit is represented by a following equation:

$$I = \sum_{N=0}^{N=N_{\max}} A_N Q^{MN}$$

(M is a number of bits of a basic operational unit; N is a natural number being one of 0 through Nmax, $A_0$ is a value whose absolute value is smaller than a value represented by the basic operational unit of M bits; each of $A_1$ through $A_{Nmax-1}$ is +1, 0, or −1; $A_{Nmax}$ is +1, or −1; and Q is a natural number equal to or more than 2)

Further, in the operation method, the predetermined data I of the data I judging unit is represented by a following equation:

$$I = CQ^n \pm 1$$

(M is a number of bits of a basic operational unit; Q is a natural number equal to or more than 2; n is n≧M; and C is $1<C<Q^M$)

In a computer readable recording medium in relation to the present invention having a computer readable program stored therein for causing a computer to perform an operation process using an operation apparatus for calculating a remainder R of data Z divided by data P, the operation process includes a data I judging process for judging if the data P equals to a predetermined data I.

Further, in the computer readable recording medium, the predetermined data I of the data I judging process is represented by a following equation:

$$I = \sum_{N=0}^{N=N_{\max}} A_N Q^{MN}$$

(M is a number of bits of a basic operational unit; N is a natural number being one of 0 through Nmax, $A_0$ is a value whose absolute value is smaller than a value represented by the basic operational unit of M bits; each of $A_1$ through $A_{N_{max}-1}$ is +1, 0, or −1; $A_{Nmax}$ is +1, or −1; and Q is a natural number equal to or more than 2)

Further, in the computer readable recording medium, the predetermined data I of the data I judging process is represented by a following equation:

$$I = CQ^n \pm 1$$

(M is a number of bits of a basic operational unit; Q is a natural number equal to or more than 2; n is $n \geq M$; and C is $1 < C < Q^M$)

BRIEF DESCRIPTION OF THE DRAWINGS

FIG. 1 explains a remainder calculation according to the first and second embodiments.

FIG. 4 explains a remainder calculation according to the first embodiment.

FIG. 6 explains another remainder calculation according to the second embodiment.

FIG. 7 explains another remainder calculation according to the third and fourth embodiments.

FIG. 8 explains the remainder calculation according to the third embodiment.

FIG. 9 explains the remainder calculation according to the fourth embodiment.

FIG. 10 explains another remainder calculation according to the fifth embodiment.

FIG. 15 explains a remainder calculating method according to the first related art.

FIG. 16 explains a remainder calculating method according to the second related art.

BEST MODE FOR CARRYING OUT THE INVENTION

Embodiment 1

Figure 2:
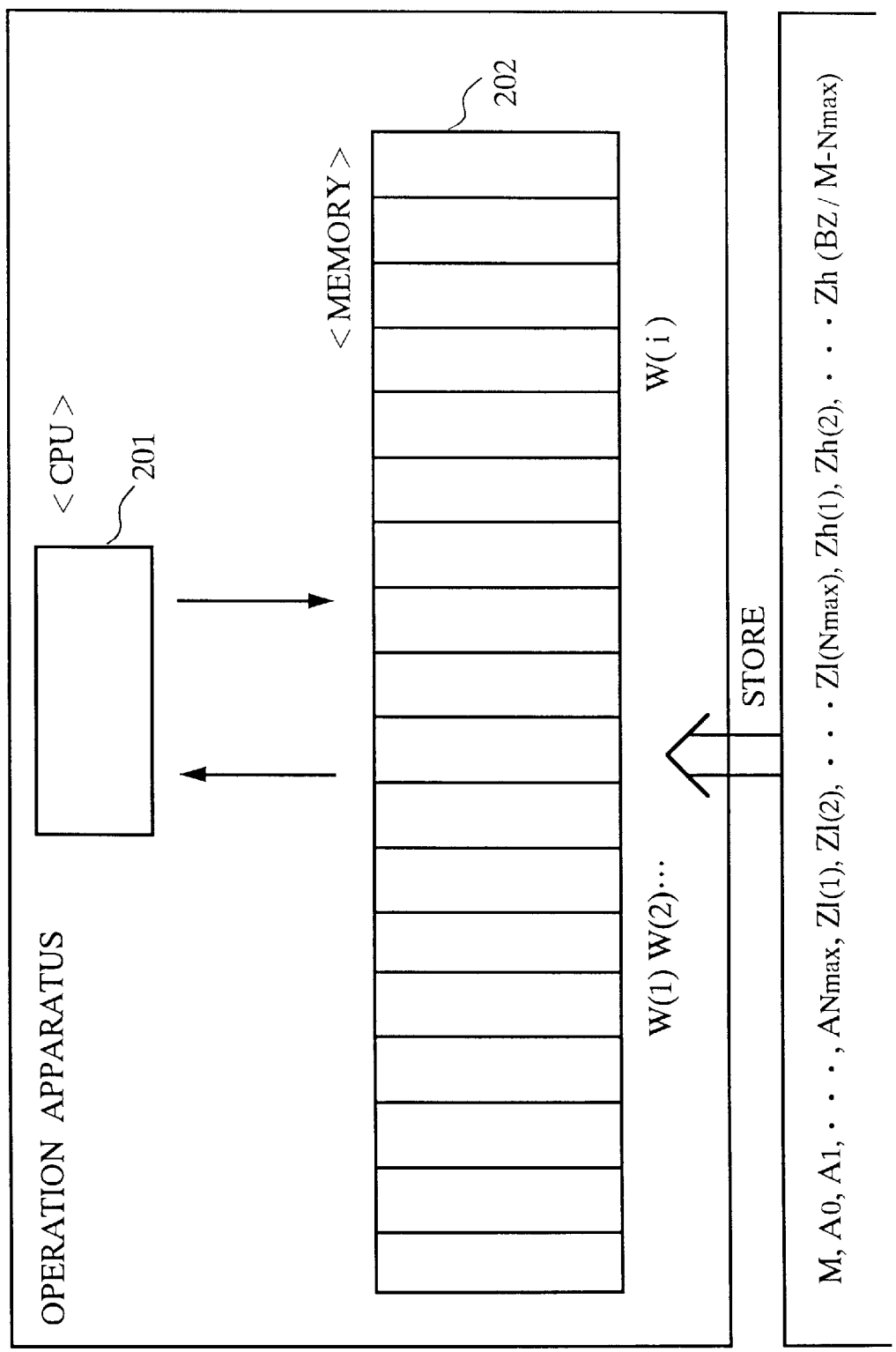
FIG. 2 shows a general configuration of a computer in relation to the first, second, third, fourth, and fifth embodiments.

FIG. 1 explains a remainder calculation using a 16-bit computer according to one embodiment of the present invention. In this embodiment, a remainder R 109 of an integer Z 101 divided by another integer I 102 is calculated.

In FIG. 1, a reference numeral 101 shows the integer Z of 240 bit represented by hexadecimal number, and each 4 digit numbers correspond to 16 bits. The data is stored in the memory by each 16 bits. A reference numeral 102 shows the integer I, which can be represented by the following equation:

$$I = \sum_{N=0}^{N=N_{\max}} A_N Q^{MN}$$

($A_N$ (N≠0) is 0 or ±1. $A_0$ is an integer whose absolute value is smaller than a basic operational unit M, and $A_{Nmas}$ is ±1) In this embodiment, M=16, $A_0$=−1, $A_1$=1, $A_2$=0, $A_3$=1, $A_4$=−1, $A_{10}$=1, and $N_{max}$=10. I is represented by decimal number.

A reference numeral 103 shows the higher 80 bit data Zh of the integer Z 101, 104 shows the lower 160 bit data Zl of the integer Z 101. Zh and Zl are divided by 16 bits from the lowest bit and each 16 bit data is stored as Zl (1) through Zl (10), Zh (1) through Zh (5). Here, 16 bit is the basic operational unit of this computer.

Figure 3:
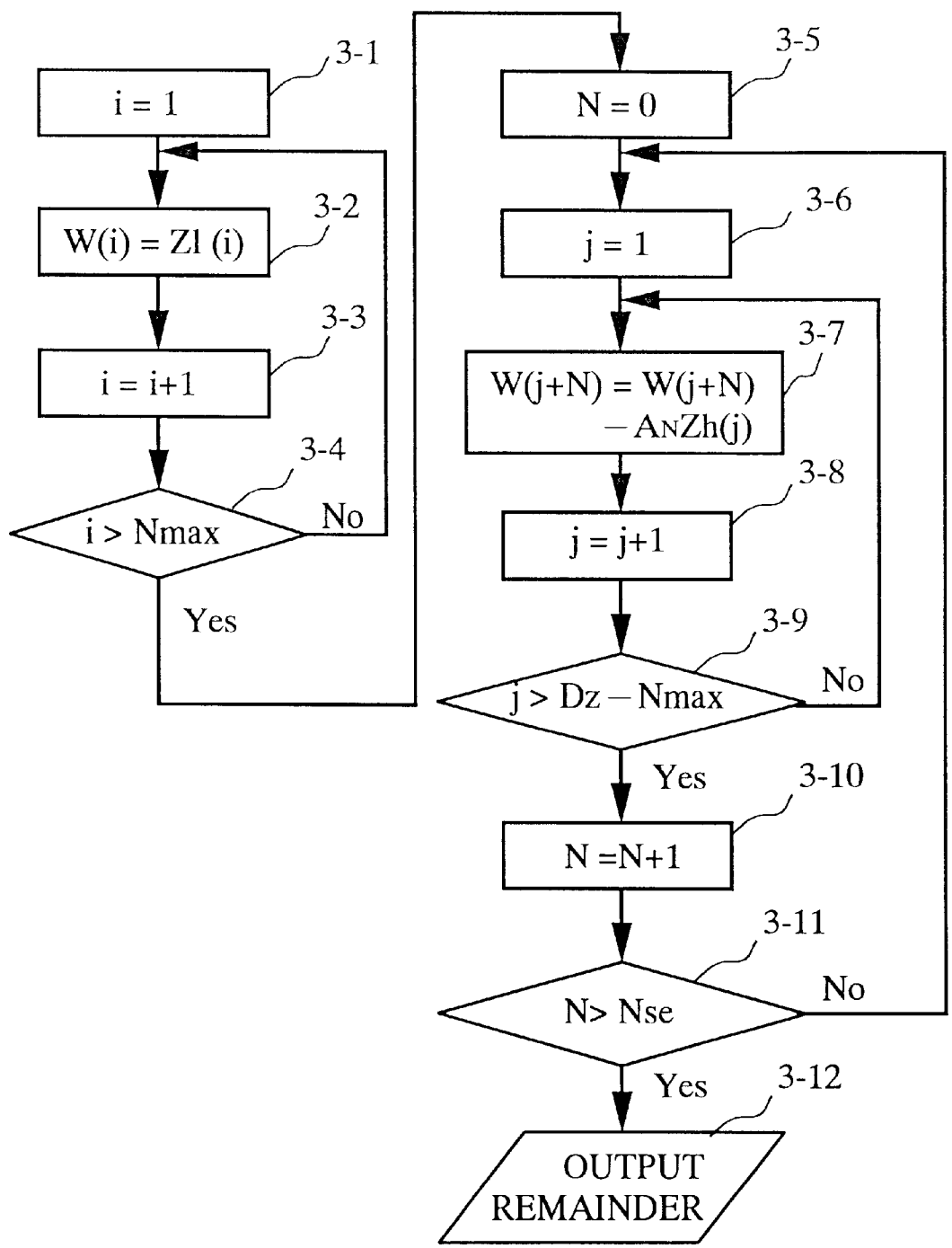
FIG. 3 shows a flow diagram showing a remainder calculating method according to the first and third embodiments.

FIG. 2 is a general configuration showing a CPU 201 and a memoty 202 of the computer. In the computer, as shown in the figure, the CPU 201 operates the data or the program stored at a location specified by the address W(i) in the memory. For example, the memory 202 stores data of M, $A_N$, $N_{max}$, Zh, Zl and so on, and the CPU 201 executes the program performing the processes as shown in FIG. 3. The same process will be performed in the computer in the subsequent embodiments. The memory 202 corresponds to a storing means, and the CPU 201 corresponds to an addition/subtraction means and a quotient calculating means.

FIG. 3 is a flow diagram showing an example of procedure of the invention described in FIG. 1. FIG. 4 shows an operation where concrete numerals are applied to the flow diagram. In FIG. 3, Dz shows a number of groups when the integer Z 101 is divided by the basic operational unit from the lowest bit, and Nse shows the number having the second largest N among terms of the integer I 102. In the present embodiment, Dz is 15 and Nse is 4. And i, j, W, and n are variables. In the following, the remainder calculating procedure will be explained referring to FIGS. 3 and 4.

The process explained below operationally equals the following equation:

$$Zl - Zh \times (I - 2_{MNmax}) = Zl - Zh \times (-2^{64} + 2^{48} + 2^{16}31\ 1) \quad \text{(equation 1)}$$

And, the following explains the procedure of operation using hexadecimal numbers, however, the operation is actually processed by binary numbers in the computer. This will be the same as in the subsequent embodiments.

First, the integer Zl 104 is divided by 16 bits and each 16 bits is stored at a location specified by the address W(i) in the memory (steps 3-1 through 3-4). Here, the operation is separated at the lower $160^{th}$ bit of the integer Z because $MN_{max}$ is 160. The memory W(i) has been cleared to zero at the initiation. In the following, the operation will be explained using Zl(i) and Zh(j).

Next, the operation of first equation is performed (steps 3-5 through 3-11).

When N=0 (step 3-5), $A_0$=−1. Therefore, 80 bit data (105) consisting Zh(1) through Zh(5) is added to 80 bit data consisting Zl(1) through Zl(5) stored in W(1) through W(10)

(in case of N=0, steps 3-6 through 3-9). By these processes, 160 bit data consisting W(1) through W(10) becomes data 401 shown in FIG. 4.

The above process is performed by addition/subtraction for each 16 bit data (step 3-7). At step 3-7, the operation is accomplished including borrowing and carrying. This is the same as in the subsequent embodiments.

Next, the process for the case of N=1 is performed (step 3-10). $A_1=1$, so that 80 bit data (106) consisting Zh(1) through Zh(5) is subtracted from 80 bit data consisting W(2) through W(6) (in case of N=1, steps 3-6 through 3-9). By these processes, 160 bit data consisting W(1) through W(10) becomes data 402.

Subsequently, the process for the case of N=2 is performed (step 3-10). Because $A_2=0$, the processes of steps 3-6 through 3-9 can be eliminated.

Then, the process for the case of N=3 is performed (step 3-10). $A_3=1$, so that 80 bit data (107) of addresses Zh(1) through Zh(5) is subtracted from 80 bit data of W(4) through W(8) (in case of N=3, steps 3-6 through 3-9). By these processes, 160 bit data consisting W(1) through W(10) becomes data 403.

Finally, the process for the case of N=4 is performed (step 3-10). $A_4=-1$, so that 80 bit data (108) of Zh(1) through Zh(5) is added to 80 bit data of W(5) through W(9) (N=4, steps 3-6 through 3-9). By these processes, 160 bit data consisting W(1) through W(10) becomes data 404, and the obtained value R 109 becomes a remainder of the integer Z 101 divided by the integer I 102.

Following the above procedure, it is possible to calculate the remainder by operating addition/subtraction of 16 bit data stored in the memory based on the value of $A_N$.

As has been described, according to the present embodiment, the remainder of the integer Z divided by the integer I can be calculated using only addition and subtraction, which enables a higher speed operation compared with the operation method including division and shift operation.

In the above procedure, when the absolute value of $A_0$ is more than 1, the operation may be performed by repeating the processes of steps 3-6 through 3-9 in case of N=1. The processing order of addition/subtraction is not limited to the above, for example, the process with the data 103 can be performed after processing the data 105 through 108. Further, "bit" means the basic unit of information, and in the present embodiment the bit is processed by binary notation, however, in the computer processed by Q notation, "bit" shows Q statuses of 0 through (Q-1). The remainder can be also calculated in the same way with this embodiment. Further, the operating method according to the embodiment can be stored in the recording medium so as to be performed by the computer. This is the same as in the subsequent embodiments.

Embodiment 2

Figure 5:
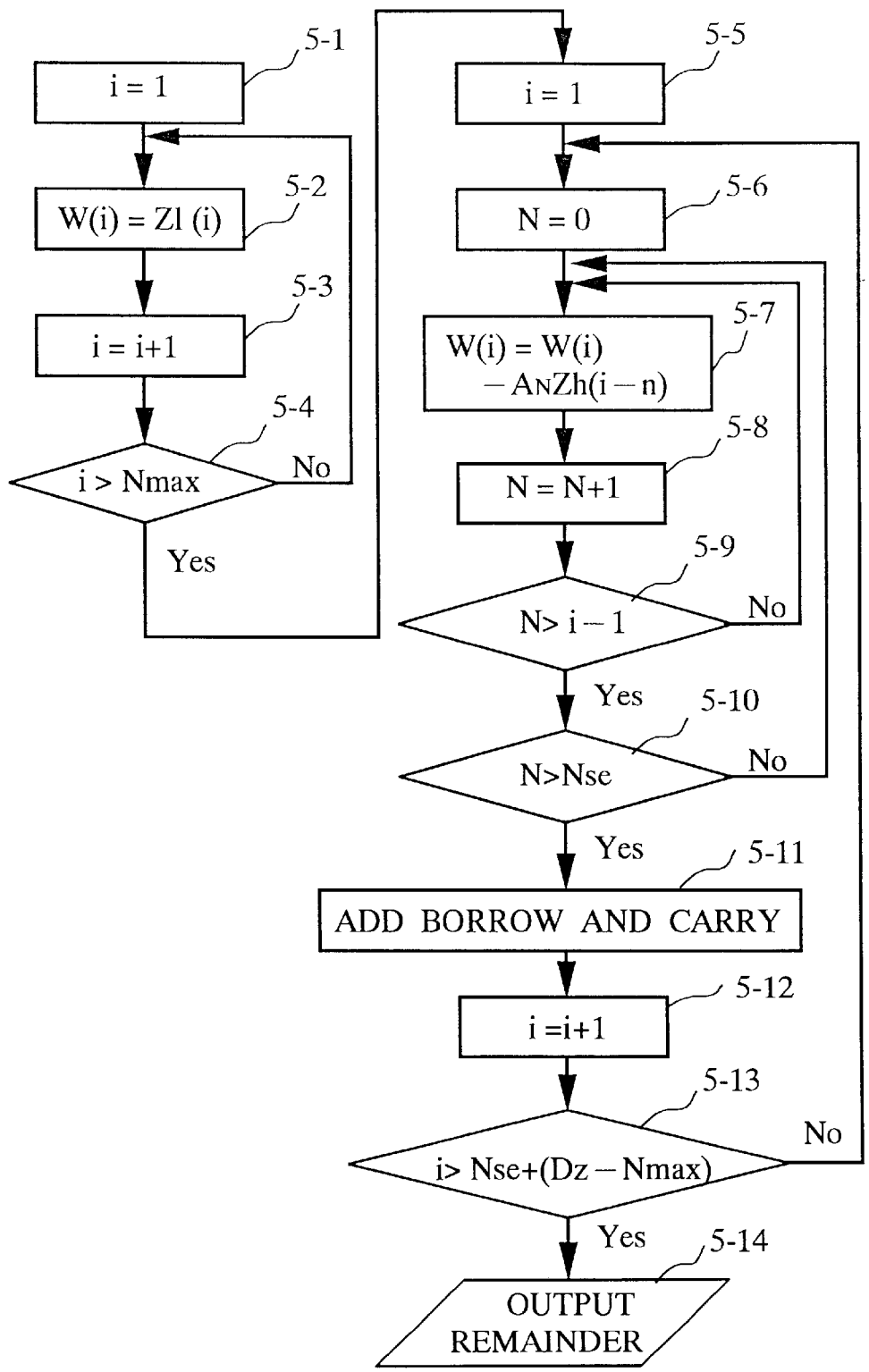
FIG. 5 shows a flow diagram showing another remainder calculating method according to the second and fourth embodiments.

FIG. 5 is a flow diagram showing another procedure of the operating a,method described in FIG. 1. FIG. 6 shows a concrete numeral operation according to the flow diagram. FIG. 1 has been explained in the first embodiment, signs in FIG. 5 are the same as ones shown in FIG. 3, and their explanations are omitted here. In the following, a remainder calculating procedure will be explained referring to FIGS. 5 and 6. The remainder obtained in this embodiment is the same as one obtained in the first embodiment.

First, data Zl 104 is divided by 16bits and each divided data is stored at a location specified by address W(i) in the memory (steps 5-1 through 5-4). Here, the integer Z is separated at the lower $160^{th}$ bit because $MN_{max}$ is 160 as well as the first embodiment.

Next, the process represented by the equation 1 is performed (steps 5-5 through 5-13).

First, the process for the case of i=1 is performed (step 5-5). Since i=1, N is only 0 (step 5-9). $A_0=-1$, therefore, Zh(1) is added to W(1) (step 5-7). By these processes, W(1) becomes aaaa (601).

Next, the process for the case of i=2 is performed (step 5-12). Since i=2, N is either of 0 and 1 (step 5-9). $A_0=-1$ and $A_1=1$, therefore, Zh(2) is added to and Zh(1) is subtracted from W(2) (step 5-7). By these processes, W(2) becomes 2222 (602).

Subsequently, the process for the case of i=3 is performed (step 5-12). Since i=3, N is 0, 1, or 2 (step 5-9). $A_0=-1$, $A_1=1$, and $A_2=0$, therefore, Zh(3) is added to and Zh(2) is subtracted from W(3) (step 5-7). By these processes, W(3) becomes 3333 (603).

Next, the process for the case of i=4 is performed (step 5-12). Since i=4, N is 0, 1, 2, or 3 (step 5-9). $A_0=-1$, $A_1=1$, $A_2=0$, and $A_3=1$, therefore, Zh(4) is added to, Zh(3) and Zh(1) are subtracted from W(4) (step 5-7). By these processes, W(4) becomes 999a (604). At this time, a borrow occurs.

Subsequently, the process for the case of i=5 is performed (step 5-12). Since i=5, N is 0, 1, 2, 3, or 4 (step 5-9). $A_0=-1$, $A_1=1$, $A_2=0$, $A_3=1$, $A_4=-1$, therefore, Zh(5) is added to, Zh(4) is subtracted from, further Zh(2) is subtracted from, Zh(1) is added to, and 1 borrowed in the case of i=4 is subtracted from W(5) (step 5-7). By these processes, W(5) becomes 4443 (605).

Next, the process for the case of i=6 is performed (step 5-12). Though i=6, N is up to 4 (step 5-10), therefore, N is 0, 1, 2, 3, or 4. However, Zh is up to Zh(5), therefore, the case of N=0 can be omitted. Since $A_1=1$, $A_2=0$, $A_3=1$, $A_4=-1$, Zh(5) is subtracted from, further Zh(3) is subtracted from, and Zh(2) is added to W(6) (step 5-7). By these processes, W(6) becomes 5556 (606). At this time, a borrow occurs.

Subsequently, the process in case of i=7 is performed (step 5-12). As well as the case of i=6, N is 2, 3, or 4. $A_2=0$, $A_3=1$, $A_4=-1$, therefore, Zh(4) is subtracted from, Zh(3) is added to (step 5-7), and 1 borrowed in the case of i=6 is subtracted from W(7) (step 5-11). By these processes, W(7) becomes 5554 (607).

Next, the process for the case of i=8 is performed (step 5-12). As well as the case of i=6, N is 3 or 4. Since $A_3=1$, $A_4=-1$, Zh(5) is subtracted from, and Zh(4) is added to W(8) (step 5-7). By these processes, W(8) becomes 6666 (608).

Subsequently, the process for the case of i=9 is performed (step 5-12). As well as the case of i=6, N is 4. $A_4=-1$, therefore, Zh(5) is added to W(9) (step 5-7). By this process, W(9) becomes 7776 (609). At this time, a carry occurs.

Finally, the process for the case of i=9 is performed (step 5-12, 5-13). As well as the case of i=6, the process of step 4-7 can be omitted. 1 carried in the case of i=9 is added to W(10) (step 5-12). By this process, W(10) becomes 999a (610).

160 bit data consisting W(0) through W(9) obtained through the above procedure is the remainder of the integer Z divided by the integer I.

As has been described, according to the embodiment, the remainder can be calculated by processing 16 bit data stored in each address only using addition/subtraction without shift operation. The data can be processed by the basic operating unit of 16 bits, therefore, a high speed remainder calculation has been performed.

Embodiment 3

FIG. 7 explains a remainder calculation using a 16-bit computer according to another embodiment of the present invention. In this embodiment, a remainder R 711 of an integer Z 701 divided by another integer I 702 is calculated.

In FIG. 7, a reference numeral 701 shows the integer Z of 256 bits represented by hexadecimal number, and each 4 digit numbers correspond to 16 bits. The data is stored in the memory by each 16 bits. I 702 is the same as the integer I described in the first embodiment, and the explanation is omitted here.

A reference numeral 703 shows higher 96 bit data Zh of the integer Z 701, 704 shows lower 160 bit data Zl of the integer Z 701. Zh and Zl are divided by 16 bits from the lowest bit and each 16 bit data is stored as Zl (1) through Zl (10), Zh (1) through Zh (5) in the memory. Here, the basic operational unit of this computer is 16 bits.

FIG. 3 is a flow diagram showing an example of the procedure of the invention described in FIG. 7. FIG. 8 shows an operation where concrete numerals are applied to the flow diagram. FIG. 3 has been explained above, and the explanation is omitted here. In the present embodiment, Dz is 16 and Nse is 4. In the following, the remainder calculating procedure will be explained referring to FIGS. 3 and 8.

The process explained below operationally equals the following equation:

$$Zl - Zh \times (I - 2^{MNmax}) - (I - 2^{MNmax}) = Zl - Zh \times (-2^{64} + 2^{48} + 2^{16} - 1) - (-2^{64} + 2^{48} + 2^{16} - 1) \quad \text{(equation 2)}$$

First, the integer Zl 704 is divided by 16 bits and stored at a location specified by the address W(i) in the memory (steps 3-1 through 3-4). Here, the operation is separated at the lower 160$^{th}$ bit of the integer Z because $MN_{max}$ is 160.

Next, the operation of the second equation is performed (steps 3-5 through 3-11).

When N=0 (step 3-5), $A_0=-1$, so that 96 bit data (705) of Zh(1) through Zh(6) is added to 96 bit data consisting Zl(1) through Zl(6) stored in W(1) through W(10) (in case of N=0, steps 3-6 through 3-9). By these processes, 160 bit data consisting W(1) through W(10) becomes data 801 shown in FIG. 8.

Next, the process for the case of N=1 is performed (step 3-10). $A_1=1$, so that 96 bit data (706) of Zh(1) through Zh(6) is subtracted from 96 bit data of W(2) through W(7) (in case of N=1, steps 3-6 through 3-9). By these processes, 160 bit data consisting W(1) through W(10) becomes data 802.

Subsequently, the process for the case of N=2 is performed (step 3-10). Because $A_2=0$, the processes of steps 3-6 through 3-9 can be eliminated.

Then, the process for the case of N=3 is performed (step 3-10). $A_3=1$, so that 96 bit data (707) of addresses Zh(1) through Zh(6) is subtracted from 96 bit data of W(4) through W(8) (in case of N=3, steps 3-6 through 3-9). By these processes, 160 bit data consisting W(1) through W(10) becomes data 803.

Subsequently, the process for the case of N=4 is performed (step 3-10). $A_4=-1$, so that 96 bit data (708) of Zh(1) through Zh(6) is added to 96 bit data of W(5) through W(10) (in case of N=4, steps 3-6 through 3-9). By these processes, 176 bit data consisting W(1) through W(11) becomes data 804. Since this number is larger than the integer I 702, the above processes are repeated using the data 804 as the integer Z. In the present embodiment, Zh of the data 804 is 1, therefore the operation can be performed by subtracting $(-2^{64}+2^{48}+2^{16}-1)$ from the data 804. The obtained value R 711 becomes the remainder of the integer Z 701 divided by the integer I 702.

Following the above procedure, it is possible to calculate the remainder on the memory by performing addition/subtraction of 16 bit data stored in the memory based on the value of $A_N$.

As has been described, according to the present embodiment, the remainder can be calculated by processing 16 bit data stored in each address using addition and subtraction without shift operation. The data is processed by the basic operational unit of 16 bits, which enables a high speed remainder calculation.

In the above procedure, when the absolute value of $A_0$ is more than 1, the operation may be performed by repeating the process for the case of N=1. When one series of the procedure cannot calculate the remainder, the same procedure may be repeated. This is the same as in the fourth embodiment.

Embodiment 4

FIG. 5 is a flow diagram showing another procedure of the invention described in FIG. 7. FIG. 9 shows a concrete numeral operation according to the flow diagram. FIG. 5 has been explained in the second embodiment, FIG. 7 has been explained in the third embodiment, and their explanations are omitted here. In the present embodiment, however, Dz is 16 and Nse is 4. In the following, a remainder calculating procedure will be explained referring to FIGS. 5 and 9. The remainder obtained in this embodiment is the same as one obtained in the third embodiment.

First, data Zl 704 is divided by 16 bits and each divided data is stored at a location specified by the address W(i) in the memory (steps 5-1 through 5-4). Here, the operation is separated at the lower 160$^{th}$ bit of the integer Z because $MN_{max}$ is 160 as well as the third embodiment.

Next, the process represented by the equation 2 is performed (steps 5-5 through 5-13).

The process for the case of i=1 is performed (step 5-5). Since i=1, N is only 0 (step 5-9). $A_0=-1$, therefore, Zh(1) is added to W(1) (step 5-7). By this process, W(1) becomes aaaa (901).

Next, the process for the case of i=2 is performed (step 5-12). i=2, therefore N is either of 0 and 1 (step 5-9). $A_0=-1$ and $A_1=1$, therefore, Zh(2) is added to, and Zh(1) is subtracted from W(2) (step 5-7). By these processes, W(2) becomes 2222 (902).

Subsequently, the process for the case of i=3 is performed (step 5-12). Since i=3, N is 0, 1, or 2 (step 5-9). $A_0=-1$, $A_1=1$, and $A_2=0$, therefore, Zh(3) is added to, and Zh(2) is subtracted from W(3) (step 5-7). By these processes, W(3) becomes 3333 (903).

Next, the process for the case of i=4 is performed (step 5-12). Since i=4, N is 0, 1, 2, or 3 (step 5-9). $A_0=-1$, $A_1=1$, $A_2=0$, and $A_3=1$, therefore, Zh(4) is added to, Zh(3) and Zh(1) are subtracted from W(4) (step 5-7). By these processes, W(4) becomes 999a (904). At this time, a borrow occurs.

Subsequently, the process for the case of i=5 is performed (step 5-12). Since i=5, N is 0, 1, 2, 3, or 4 (step 5-9). $A_0=-1$, $A_1=1$, $A_2=0$, $A_3=1$, and $A_4=-1$, therefore, Zh(5) is added to, Zh(4) and Zh(2) are subtracted from, Zh(1) is added to, and further 1 borrowed in case of i=4 is subtracted from W(5) (step 5-7). By these processes, W(5) becomes 4443 (905).

Next, the process for the case of i=6 is performed (step 5-12). 10 Though i=6, N is up to 4 (step 5-10), therefore, N is 0, 1, 2, 3, or 4. Since $A_0=-1$, $A_1=1$, $A_2=0$, $A_3=1$, and $A_4=-1$, Zh(6) is added to, Zh(5) is subtracted from, further Zh(3) is subtracted from, and Zh(2) is added to W(6) (step 5-7). By these processes, W(6) becomes 5555 (906).

Subsequently, the process for the case of i=7 is performed (step 5-12). Though i=7, N is up to 4 (step 5-10), therefore, N is 0, 1, 2, 3, or 4. Further, since Zh is up to Zh(6), the process for N=0 can be omitted. Accordingly, the processes are performed for the case of N is 1, 2, 3, or 4. $A_1=1$, $A_2=0$, $A_3=1$, and $A_4=-1$, therefore, Zh(6) is subtracted from, Zh(4) is subtracted from, and further Zh(3) is added to W(7) (step 5-7). By these processes, W(7) becomes 5556 (907). At this time, a borrow occurs.

Next, the process for the case of i=8 is performed (step 5-12). As well as the case of i=7, N is 2, 3 or 4. Since $A_2=0$, $A_3=1$, and $A_4=-1$, Zh(5) is subtracted from, and Zh(4) is added to W(8) (step 5-7), and 1 borrowed in case of i=7 is subtracted (step 4-11). By these processes, W(8) becomes 6665 (908). Subsequently, the process for the case of i=9 is performed (step 5-12). As well as the case of i=6, N is 3 or 4. $A_3=1$, and $A_4=-1$, therefore, Zh(6) is subtracted from and Z(5) is added to W(9) (step 5-7). By this process, W(9) becomes 7777 (909).

Finally, the process for the case of i=10 is performed (step 5-12, 5-13). As well as the case of i=6, the process is performed only for N is 4. $A_4=-1$, therefore, Zh(6) is added to W(9) (step 5-7). By this process, W(10) becomes 9998 (910). At this time, a carry occurs.

176 bit data 709 consisting W(1) through W(11) obtained through the above procedure is larger than the integer I 102. Accordingly, the above procedure is repeated using the data 709 as the integer Z. In the present embodiment, Zh=1, therefore the operation can be performed by subtracting $(-2^{64}+2^{48}+2^{16}-1)$ from the data 709. The obtained value R 711 becomes the remainder of the integer Z 701 divided by the integer I 702.

As has been described, according to the present embodiment, the remainder can be calculated by processing 16 bit data stored in each address using addition without shift operation. The data is processed by the basic operational unit of 16 bits, which enables a high speed remainder calculation.

Embodiment 5

FIG. 10 explains a remainder calculation using a 16-bit computer according to another embodiment of the present invention. In this embodiment, a remainder R 1008 of an integer Z 1001 divided by another integer I 1002 is calculated.

In FIG. 10, a reference numeral 1001 shows the integer Z of 224 bits represented by hexadecimal number, and each numeral, divided by the space, corresponds to 16 bits. The data is stored in the memory by each 16 bits. The integer I 1002 can be represented by the following:

$$I=C\cdot Q^n+f(1<C<Q^M n\geq M1\leq f<Q^M)$$

The integer I is represented by decimal number and hexadecimal number in this embodiment, and C=ff9c (hexadecimal number) and Q=2, n=144 (decimal number), f=1 (hexadecimal number), and M=16 (decimal number). 1003 shows higher 80 bit data Zh of the integer Z 1001, and 1004 shows lower 144 bit data Zl of the integer Z 1001.

The data Zh and the data Zl are respectively divided by 16 bits from the lowest bit and each 16 bit data is stored as each of data Zl(1) through data Zl(9), and each of data Zh(1) through data Zh(5). Here, the basic operational unit is 16 bits for this computer.

The highest 16 bit of I is ff9c, and the remainder can be calculated by the following.

First, Zh 1003 is divided by ff9c, the quotient q 1005 and the remainder r 1006 are obtained. Next, the remainder r 1006 is added to Zl as the higher bits to produce data 1007.The quotient q 1005 is subtracted from the data 1007. In this way, the remainder R 1008 can be calculated.

Figure 11:
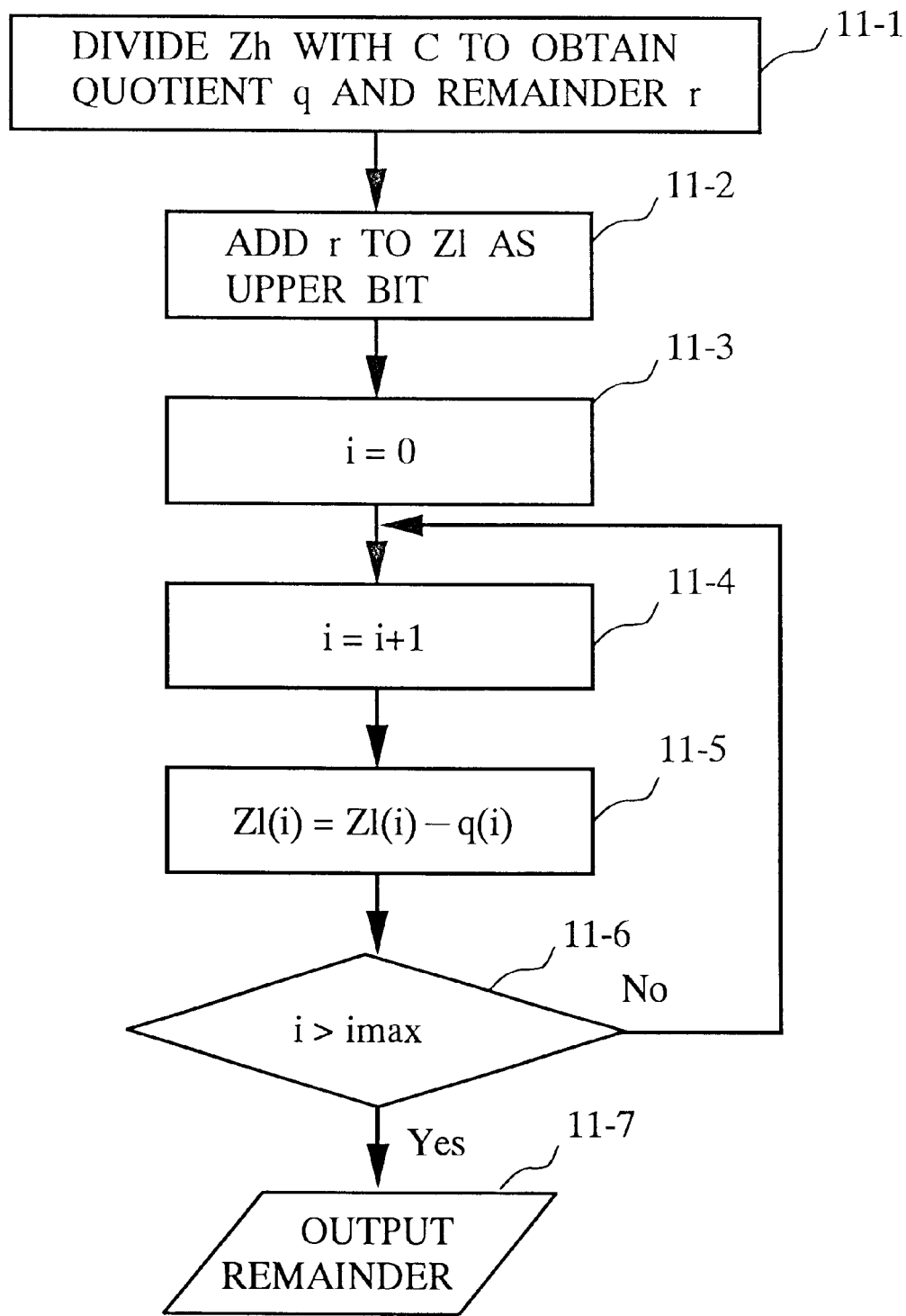
FIG. 11 shows a flow diagram explaining the remainder calculation according to the fifth embodiment.

FIG. 11 is a flow diagram showing a concrete procedure for calculating the remainder. In the figure, q(i) shows data obtained from division of the quotient q 1005 by 16 bits from the lowest bit, imax is the maximum value of i of q(i). In this embodiment, C=ff9c and imax=4. The following explains the concrete operating procedure referring to the figure.

First, Zh 1003 is divided by C=ff9c to calculate the quotient q 1005 and the remainder r 1006 (step 1101). Namely, the highest 32 bit data dddd cccc of Zh 1003 is divided by ff9c to calculate the quotient and the remainder (division 1). Next, since the remainder of the division 1 is 991c, data 991c bbbb is divided by ff9c to calculate the quotient and the remainder (division 2). Consequently, since the remainder of the division 2 is a21b, data a21b aaaa is divided by ff9c to calculate the quotient and the remainder (division 3). Further, since the remainder of the division 3 is 1636, data 1636 9999 is divided by ff9c to calculate the quotient and the remainder (division 4). Through the above four times divisional operations, the quotient q 1005 and the remainder r 1006 of Zh divided by ff9c can be obtained.

Next, the obtained remainder is added to Zl (1004) as the higher bits to obtain the data 1007 (step 11-2).

Subsequently, the quotient q 1005 of Zh divided by ff9c is subtracted from the data 1007. The following operation includes borrowing and carrying. First, q(1)=163f is subtracted from Zl(1)=0000 (in case of i=1, step 11-5) (addition/subtraction 1). Next, q(2)=a25b is subtracted from Zl(2)= 1111 (in case of i=2, step 11-5) (addition/subtraction 2). Subsequently, q(3)=9958 is subtracted from Zl(3)=2222 (in case of i=3, step 11-5) (addition/subtraction 3). q(4)=de34 is subtracted from Zl(4)=3333 (in case of i=4, step 11-5) (addition/subtraction 4). After the above four times addition/subtraction operations (step 11-6), the remainder is output (step 11-7).

Through the above four divisions and four additions/subtractions, the remainder R 1008 of the integer Z 1001 divided by the integer I 1002 can be calculated.

As has been described, according to the present invention, steps for multiplying f (3 in case of the first related art, ff9d in case of the second related art) are not required, which are required in the first and the second related arts, because the integer I 1002 can be represented by $I=ff9c\cdot 2^{144}+1$. Consequently, each 16 bit data of the quotient q 1005 never exceeds 16 bits, and the minimum number of additions/subtractions are merely required. Accordingly, the remainder calculating method can be obtained, where the number of instructions is small and the code size is compact. Further, since the number of instructions is small, the operation can be performed at a high speed.

In the present embodiment, the case where f=1 is explained. When f ≠1, the quotient q 1005 multiplied by f and the data 1007 should be added/subtracted. In this case, if the result obtained from the multiplication of r(i) of each 16 bit data of the quotient and f is smaller than 16 bits, the number of additions/subtractions can be minimized as well as in the case of f=1.

Embodiment 6

Figure 12:
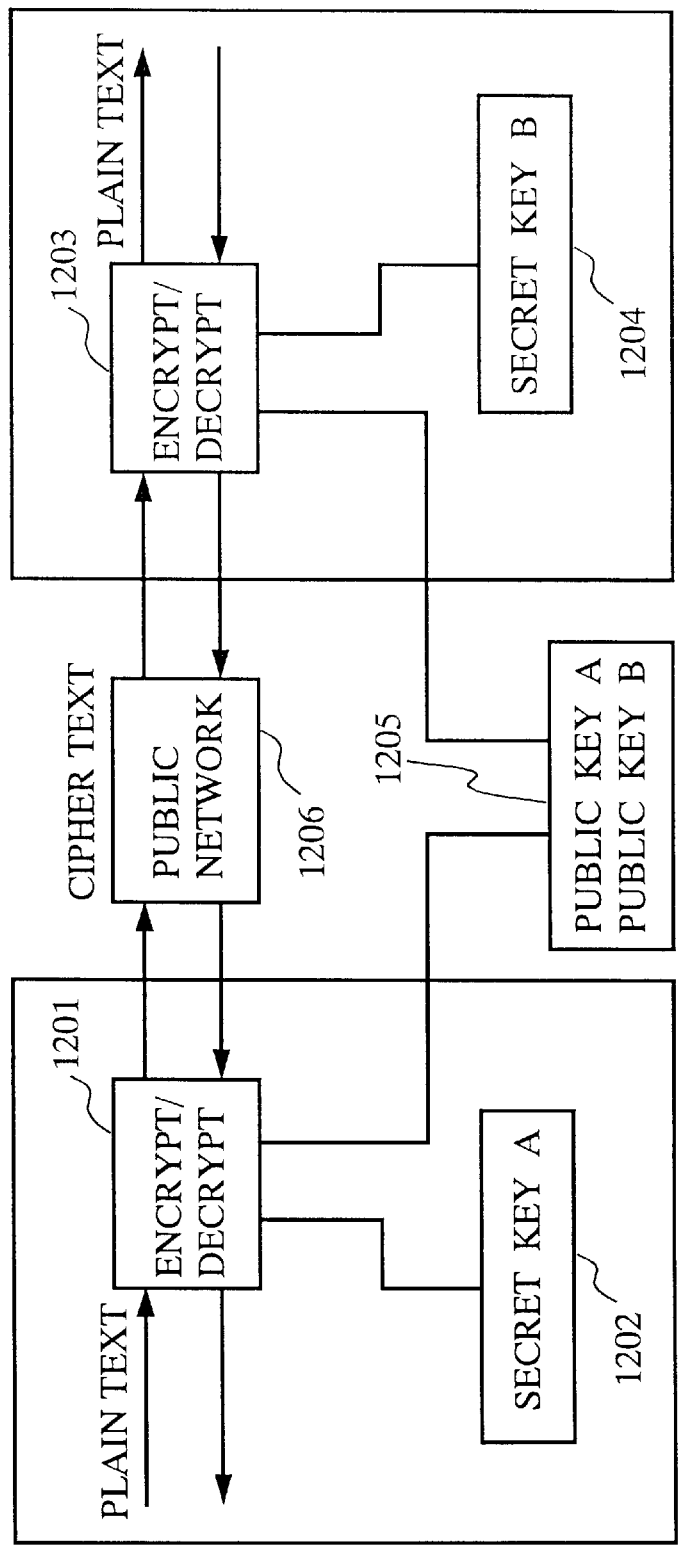
FIG. 12 is a general configuration showing a communication system in relation to the sixth embodiment.

FIG. 12 shows a general configuration of communication system according to one embodiment of the present invention. In the figure, a reference numeral 1201 shows an encrypting/decrypting apparatus of a communicator A, 1202 shows a secret key holding apparatus of the communicator A, 1203 shows an encrypting/decrypting apparatus of a communicator B, 1204 shows a secret key holding apparatus of the communicator B, 1205 shows a public key holding apparatus, and 1206 shows an open network. In this system, a secrecy of the communication data can be held by encrypting/decrypting data using a public key cryptosystem so called ElGamal cryptsystem. The public key cryptosystem uses different two keys for encrypting and decrypting data, respectively. The transmitter encrypts the transmitting data using the public key, which is opened by the receiver, and the receiver decrypts the received data using a secret key, which is kept secret by the receiver. It is, of course, actually impossible to obtain the secret key from the public key.

ElGamal cryptosystem is the public key cryptosystem which has been developed based on the difficulty in solving the discrete logarithm problem. The discrete logarithm problem is to obtain x in the following equation when p, g, a are given:

$$a \equiv g^x \bmod p \quad \text{(equation 3)}$$

where p is a prime number; g is a primitive element over Glois Field GF(p); a is a natural number, of which a remainder of division by p is not 0.

When p is large, it is difficult to obtain the solution in an actual time even operated by the computer.

Figure 13:
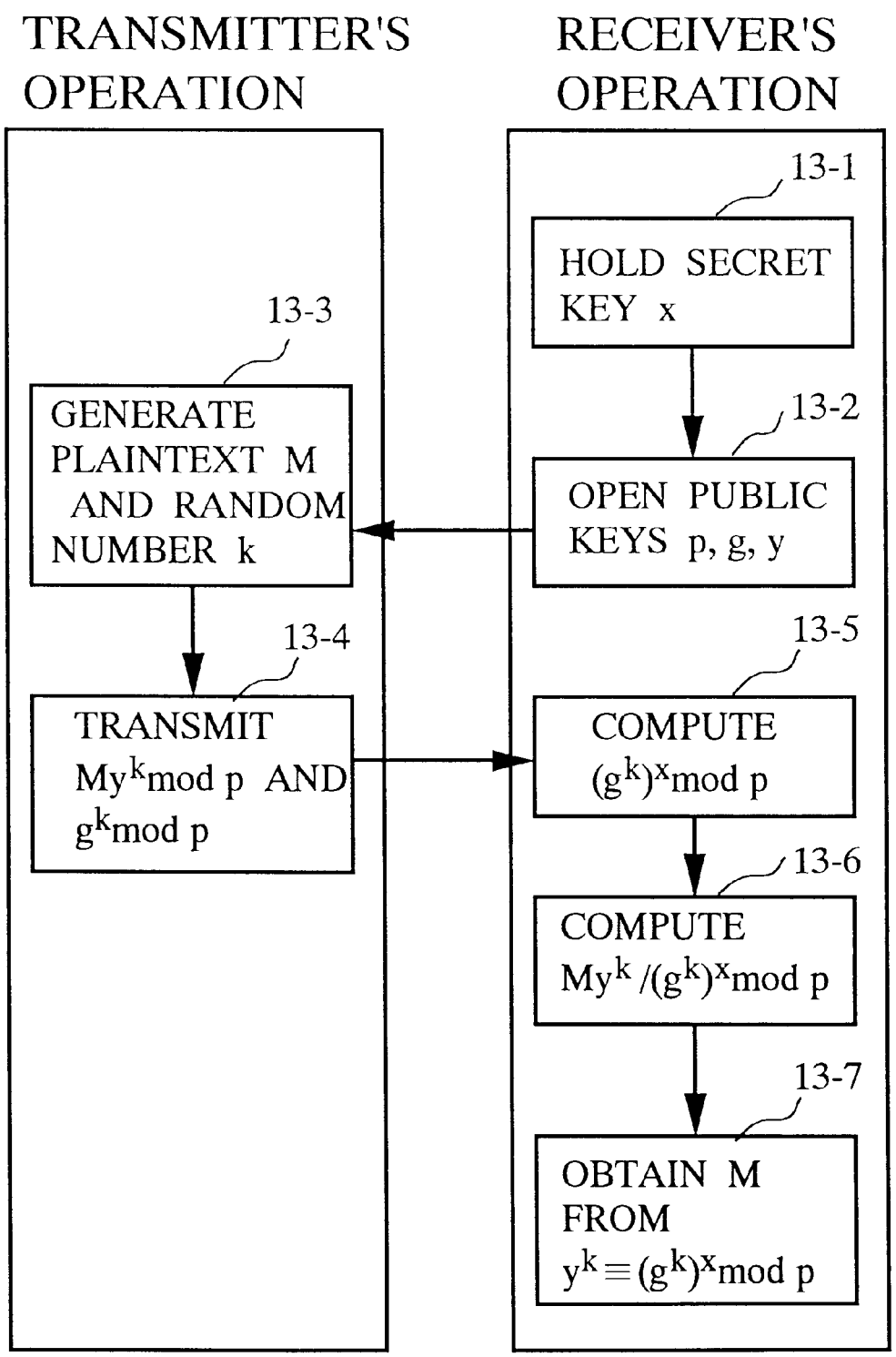
FIG. 13 is a flow diagram showing an operation of the communication system of the sixth embodiment.

FIG. 13 shows a flow diagram of encrypting/decrypting data according to the embodiment. The operation of encrypting/decrypting transmitting data will be explained with reference to FIG. 13.

In this embodiment, the case where the transmitter encrypts plaintext data M and transmits the encrypted data in secret will be explained.

The receiver holds a secret key x (step 13-1), and opens p, g, y as his public keys (step 13-2). The transmitter generates an arbitrary random number k (step 1303), and transmits $My^k$ mod p and gkmod p (step 13-4). The receiver obtains $(g^k)^x$ mod p using the received gkmod p and his secret key x (step 13-5). Since $(g^k)^x \equiv y^k$ mod p, $My^k/(g^k)^x$ mod p is calculated using this relationship (step 13-6). By the above processes, the received data M can be decrypted (step 13-7). In this case, the secrecy of the data can be held because the decrypting process requires x, which is known only to the receiver.

In the present embodiment, it is required to repeatedly operate the remainder calculation of the prime number p, namely, mod p for encrypting/decrypting data. Accordingly, it is necessary for this encrypting/decrypting process to perform a high speed operation of the remainder calculation of the prime number p. This is also important for improvement of the cipher strength. Therefore, the prime number p which can be represented by the following equation should be selected according to the operational unit $Q^M$ of the computer:

$$I = \sum_{N=0}^{N=N_{\max}} A_N Q^{MN}$$

($A_N(N \neq 0)$ is 0 or $\pm 1$. $A_0$ is an integer whose absolute value is smaller than the basic operational unit M, and $A_{Nmax}$ is $\pm 1$, and Q is a natural number which is equal to or more than 2) By using this, as described in the first through fourth embodiments, the high speed remainder calculation can be accomplished, which enables to transform data at a high speed, further to improve the difficulty of cryptanalysis for the processing time accompanied by the high speed operation.

In another way, the prime number p which is represented by the following equation is selected according to the operational unit $Q^M$:

$I = CQ^n \pm 1$ ($1 < C < Q^M$, $n \geq M$, Q is a natural number which is equal to or more than 2)

By using this, as explained in the fifth embodiment, the high speed data transformation method can be obtained, in which the number of instructions is small and the code size is compact.

Figure 14:
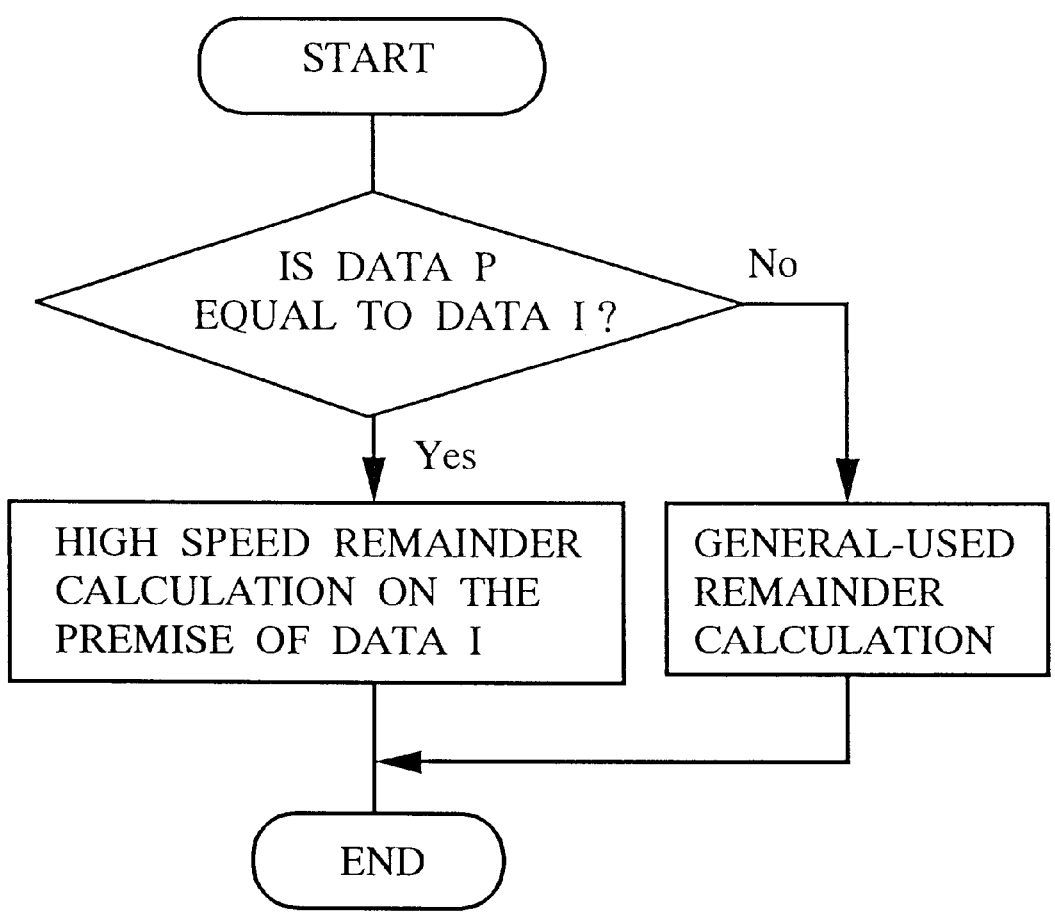
FIG. 14 is a flow diagram explaining the judgement of data P according to the sixth embodiment.

Further, when the remainder of division by the data P is to be calculated, it is checked whether the data P is eqaul to the data I represented by one of the above two equations as shown in FIG. 14. If the check result is "Yes", the high speed remainder calculation can be operated based on the data I according to the present invention. If the result is "No", another general-used remainder calculation is applied. This check is performed by previously memorizing the data I of the above two equations and comparing them with the data P. In this way, the high speed encryption/decryption is alternatively performed between the apparatuses based on the specific data I, and in case of the communication between other apparatuses, general-used encryption/decryption is performed.

Industrial Applicability

It is possible to calculate the remainder only by additions/subtractions using the operational process implemented by the operation apparatus, the operation method or the computer using the program stored in the recording medium according to the present invention. The calculation does not involve shift operations, divisions or multiplications, which allows the operation to proceed at a high speed. In addition, the code size is compact.

Further, since the present invention includes a step for judging whether the data for divisor is applicable to the high-speed operation of the invention or not, the high-speed operation can be alternatively performed. Namely, an operation suitable to the characteristics of data for divisor can be selected in the apparatus performing the operation of the invention as well as the general-used operation.

What is claimed is:

1. An operation apparatus for calculating a remainder R of data Z having Bz bits divided by data I represented by a following equation:

$$I = \sum_{N=0}^{N=N_{\max}} A_N Q^{MN}$$

(M is a number of bits of a basic operational unit; N is a natural number being one of 0 through Nmax, $A_0$ is a value whose absolute value is smaller than a value represented by the basic operational unit of M bits; each of $A_1$ through $A_{Nmax-1}$ is +1, 0, or −1; $A_{Nmax}$ is +1, or −1; and Q is a natural number equal to or more than 2) the operation apparatus comprising:

(1) a data Zl storing region for storing data Zl of lower M×Nmax bits of the data Z;

(2) a data Zh storing region for storing data Zh of higher (Bz−M×Nmax) bits of the data Z;

(3) a data $A_N$ storing region for storing the data $A_N$; and (4) an addition/subtraction unit for calculating the remainder R by determining an operation between addition and subtraction based on positive/negative of the data $A_N$, and operating addition/subtraction of data stored in at least a part of the data Zl storing region and data stored in at least a part of the data Zh storing region.

2. The operation apparatus according to claim 1, wherein the data Zl storing region stores the data Zl as data Zl(i) divided by the basic operational unit of M bits sequentially from a lowest side within a range of a natural number i ($1 \leq i \leq$ Nmax) in a data Zl(i) region;

wherein the data Zh storing region stores the data Zh as data Zh(j) divided by the basic operational unit of M bits sequentially from a lowest side within a range of a natural number j (a natural number of $1 \leq j \leq$ (Bz/M)−Nmax with raising its decimals) in a data Zh(j) region; and wherein the addition/subtraction unit determines the operation between addition and subtraction using N having a predetermined relationship with i and j, and operates addition/subtraction of the data Zl(i) and the data Zh(j).

3. The operation apparatus according to claim 2, wherein the addition/subtraction unit determines the operation using N having a relationship of N=i−j that the operation is subtraction when the data $A_N$ is positive, and that the operation is addition when the data $A_N$ is negative.

4. The operation apparatus according to claim 3, wherein the addition/subtraction unit continuously operates addition/subtraction for pairs of i and j having a relationship of N=i−j against a certain N.

5. The operation apparatus according to claim 3, wherein the addition/subtraction unit continuously operates addition/subtraction for pairs of N and j having a relationship of N=i−j against a certain i.

6. An operation method, using an operation apparatus, for calculating a remainder R of data Z having Bz bits divided by data I represented by a following equation:

$$I = \sum_{N=0}^{N=N_{\max}} A_N Q^{MN}$$

(M is a number of bits of a basic operational unit; N is a natural number being one of 0 through Nmax, $A_0$ is a value whose absolute value is smaller than a value represented by the basic operational unit of M bits; each of $A_1$ through $A_{Nmax-1}$ is +1, 0, or −1; $A_{Nmax}$ is +1, or −1; and Q is a natural number equal to or more than 2) the operation method comprising:

(1) a data Zl storing step of storing data Zl of lower M×Nmax bits of the data Z;

(2) a data Zh storing step of storing data Zh of higher (Bz−M×Nmax) bits of the data Z;

(3) a data $A_N$ storing step of storing the data $A_N$; and (4) an adding/subtracting step of calculating the remainder R by determining an operation between addition and subtraction based on positive/negative of the data $A_N$, and operating addition/subtraction of data stored in at least a part of the data Zl storing region and data stored in at least a part of the data Zh storing region.

7. The operation method according to claim 6, wherein the data Zl storing step stores the data Zl as data Zl(i) divided by the basic operational unit of M bits sequentially from a lowest side within a range of a natural number i ($1 \leq i \leq$ Nmax);

wherein the data Zh storing step stores the data Zh as data Zh(j) divided by the basic operational unit of M bits sequentially from a lowest side within a range of a natural number j (a natural number of $1 \leq j \leq$ (Bz/M)−Nmax with raising its decimals); and wherein the adding/subtracting step determines the operation between addition and subtraction using N having a predetermined relationship with i and j, and operates addition/subtraction of the data Zl(i) and the data Zh(j).

8. A computer readable recording medium having a computer readable program stored therein for causing a computer to perform an operation process using an operation apparatus for calculating a remainder R of data Z having Bz bits divided by data I represented by a following equation:

$$I = \sum_{N=0}^{N=N_{\max}} A_N Q^{MN}$$

(M is a number of bits of a basic operational unit; N is a natural number being one of 0 through Nmax, $A_0$ is a value whose absolute value is smaller than a value represented by the basic operational unit of M bits; each of $A_1$ through $A_{Nmax-1}$ is +1, 0, or −1; $A_{Nmax}$ is +1, or −1; and Q is a natural number equal to or more than 2)

wherein the operation process comprises:

(1) a data Zl storing process for storing data Zl of lower M×Nmax bits of the data Z;

(2) a data Zh storing process for storing data Zh of higher (Bz−M×Nmax) bits of the data Z;

(3) a data $A_N$ storing process for storing the data $A_N$; and (4) an adding/subtracting process for calculating the remainder R by determining an operation between addition and subtraction based on positive/negative of the data $A_N$, and operating addition/subtraction of data stored in at least a part of the data Zl storing region and data stored in at least a part of the data Zh storing region.

9. The computer readable recording medium according to claim 8, wherein the data Zl storing process stores the data Zl as data Zl(i) divided by the basic operational unit of M bits sequentially from a lowest side within a range of a natural number i ($1 \leq i \leq$ Nmax);

wherein the data Zh storing process stores the data Zh as data Zh(j) divided by the basic operational unit of M bits sequentially from a lowest side within a range of a natural number j (a natural number of $1 \leq j \leq$ (Bz/M)−Nmax with raising its decimals); and wherein the adding/subtracting process determines the operation between addition and subtraction using N having a predetermined relationship with i and j, and operates addition/subtraction of the data Zl(i) and the data Zh(j).

* * * * *